United States Patent [19]

Visser

[11] Patent Number: 4,860,356

[45] Date of Patent: Aug. 22, 1989

[54] ADAPTIVE EXTREMA CODING SIGNAL PROCESSING SYSTEM

[75] Inventor: Arie Visser, Reston, Va.

[73] Assignee: Extrema Systems International Corp., Reston, Va.

[21] Appl. No.: 158,681

[22] Filed: Feb. 22, 1988

[51] Int. Cl.[4] .............................................. G01L 5/00
[52] U.S. Cl. ......................................... 381/41; 375/22
[58] Field of Search ............................. 381/41; 375/22

[56] References Cited

U.S. PATENT DOCUMENTS 4,545,065  0/0000  Visser .................................... 381/41
4,700,360  0/0000  Visser .................................... 375/22

Primary Examiner—Emanuel S. Kemeny
Attorney, Agent, or Firm—Kenyon & Kenyon

[57] ABSTRACT

Adaptive extrema encoding reduces chipping noise by reducing the added-noise signal for low level input signals. Alternatively, the input signal is controlled.

38 Claims, 7 Drawing Sheets

ADAPTIVE EXTREMA CODING SIGNAL PROCESSING SYSTEM

BACKGROUND OF THE INVENTION

The present invention relates to the field of signal processing, and in particular, to the field of extrema coding signal processing. In extrema coding, an analog signal is encoded, along with broadband noise having a spectrum containing frequencies significantly higher than the highest frequency in the analog signal, as a series of transitions identifying the extrema of the analog signal and the noise. Thus, the extrema, i.e., the maximum and minimum points of the analog signal and the noise are converted to zero crossings of a binary signal. In a preferred implementation, the analog signal and noise are first subject to differentiation, which converts the maximum and minimum points to zero crossings, and then the zero crossings are provided to a broadband infinite clipper, which converts the zero crossing points into defined transitions of a binary signal. The binary signal contains sufficient information to enable substantial reproduction of the analog signal by a filter device, for example, an integrator. The noise signal necessary for extrema coding may either be added to the analog signal or naturally present, and if added, it may be added either before or after differentiation. If added after differentiation, the transitions of the encoded signal technically represent zero crossings of the noise signal in addition to extrema of the analog input signal, but the coding process is essentially the same in either case.

Extrema encoded signals provided to the human ear sound subjectively the same as the original analog signal, even though the time domain waveform of the extrema coded signal is very different than the original analog signal. It is postulated that the human ear essentially performs a filtering or integrating function much as the integrator circuit can be used to recover substantially the analog signal. It also appears that other portions of the human sensory system, i.e., the human eye, also are responsive to extrema encoded signals.

The basic patent for extrema coding is applicant's U.S. Pat. No. 4,545,065. U.S. Pat. No. 4,700,360 discloses an extrema coding digitizing signal processing method and apparatus, wherein an extrema encoded signal is subjected to a digitization process so that it can be transmitted along a transmission medium.

Extrema coding offers several advantages, most notably, improved dynamic range due to the fact that an extrema encoded signal is a binary signal, relative simplicity of circuitry and signal waveform, and the ability to conserve bandwidth by reducing the amount of information necessary to be transmitted. This results from the fact that the human sensory system is most receptive to the location of the extrema or maximum and minimum points of the signal received by the sensory system, and not to the other information present in the signal. However, there must be sufficient background noise having a spectrum including frequencies higher than the highest frequency in the analog input signal, in order that the extrema coding principle can work. If there is insufficient background noise, noise may be added by a suitable noise source. Without adding background noise to the analog input signal, or if there is insufficient analog noise or if the broadband infinite clipper does not have a sufficiently high bandwidth, then the human sensory system will perceive a distorted signal. A distorted signal was observed by, for example, Licklider and Pollack in their experiments on differentiated, integrated and clipped waveforms, as set forth in their paper entitled "Effects of Differentiation, Integration, and Infinite Peak Clipping upon the Intelligibility of Speech," Journal of the Acoustical Society of America, Vol. 20, No. 1, 1948, pp. 42-51. Licklider and Pollack did not recognize the significance of the background noise in the analog signal, and thus never comprehended the principles of extrema coding.

The present invention is thus related generally to the field of electronic signal processing, and particularly to the area of sensor systems, preamplifiers and feature selection systems.

More particularly, the invention can be better understood by applying some of the principles of the theory of perception.

Information in the world around us is of an extraordinarily complex nature. The complexity of the data that we as observers would like to take in is such that analysis of all that could be relevant is not feasible. An intelligent selection process must precede the brain as a tool to take decisions. The more intelligent the selection process, the more effective the final interpretation of the outside world will be.

The present invention can be used to construct such a selection system. The selection mechanism is normally regarded to be an integral part of a biological perception system. It is, therefore, suggested that the method according to the present invention might find application in cases where existing perception mechanisms are impaired or need to be improved for other reasons. As a feature selection mechanism, the invention can accomplish a significant amount of information reduction. This results in the opportunity to utilize the invention in communication systems. The invention may also find application in pattern recognition machines and could be used in processes to realize artificial intelligence.

Broadly, the invention comprises an improvement to the signal processing system known as extrema coding.

A brief description of extrema coding including some of the problems overcome by the new technique now follows.

As described above, extrema coding is a method that applies infinite peak clipping to detect, process and amplify an input waveform. Normally, the clipping process will reduce the information content of the signal in a rather crude manner. Features of information that are usually perceptible will be totally missing in the clipped waveform. The clipping process will give rise to entirely new components referred to as harmonic distortion. This makes clipping in general unsuited for high quality feature detection. Extrema coding relies on the notion that a waveform can be clipped without causing significant degradation when the waveform is in the presence of random noise of a bandwidth of at least a factor greater than that of the signal. Background noise of sufficient energy can usually be found accompanying this signal, guaranteeing practicality of the extrema coding technique. This background noise may not be totally random, but it is sufficient to allow practical extrema coding. If insufficient background noise is present, however, artificially generated noise may be added, as discussed above.

Extrema coding can be described with reference to FIG. 1. Signals such as those normally provided to the human perception system will consist of a superposition of waveforms generated by a number of different sources. Simplified, the combined waveform will comprise a primary most significant waveform, usually called the focal stimulus, accompanied by a number of background variations, the background stimulus. A third waveform, relating to the conditions imposed by the perception mechanism, may be added in the form of wide-band random noise. This third signal can be called the residue stimulus. The three waveforms, combined as shown at the output of summing block 10 in FIG. 1, are provided to a differentiator 20 in a preferred embodiment of an extrema coding system. The differentiator 20 changes the times of occurrence of the minima and maxima (the extrema) of the combined signal into time domain zero crossings. An infinite clipper can be used to detect the zero crossings and change all other input levels to one of two signal levels, a positive or a negative amplitude. These levels are shown by $+A$ or $-A$ in FIG. 1. The broadband infinite clipper is indicated at 30. Due to the fact that the bandwidth of the noise is significantly greater than the bandwidth of the focal stimulus, the clipping circuit will need to be fast enough not only to detect the extrema of the focal stimulus, but also to switch at the transitions of the noise. The clipped signal output is provided to an integrator 40 or to some other low pass filter circuit. At the output, a waveform will appear that may closely resemble the original focal and background stimulus. The input/output characteristic of the extrema coding system largely depends upon the probability density distribution of that portion of the input signal that is considered to be the noise. If the noise is shown to have a Gaussian distribution, the system has been shown to give an exponential, error function like input/output relationship. Despite the obvious degradations during a short time interval (for example up to 10 zero crossings), and the amplitude compression and masking effects, the extrema coding signal processing system has been demonstrated to give little or no subjective degradation when provided with both audio and video analog input signals.

Extrema coding largely relies on the availability of broadband random noise. In the absence of such additive noise, output signals can be strongly degraded. It is the bandwidth of the noise that determines the actual output quality. When signal levels are moderate to high, the background stimuli will often provide sufficient extrema, in which case the added noise or residue noise may not be required. In cases where low level waveforms are provided, the absence of noise will result in a low zero crossing rate causing severe degradation. When no input signal is present, the added noise and especially its bandwidth is most critical. The noise will be clipped resulting in a non-zero output level. In order to provide a zero output level in the absence of an input signal, the noise spectrum theoretically would have to be infinite. It can be calculated that the RMS output voltage will drop with 3 db for each octave of noise bandwidth that is added.

In order to obtain acceptable signal to noise ratios, for instance, for communications systems, this translates into the need for clipping speeds exceeding the 10 MHZ range. With the current state of the art of electronic components and designs techniques, it can be difficult and costly to operate at these speeds. This applies to both the clipper and the noise source.

Further, extrema coding signal processing techniques are limited by constraints imposed by noise generator designs. The signal response of the extrema coding signal processing circuit is determined largely by the probability density distribution of the noise. The probability density distribution will determine the dynamic range of input levels that can be handled. As a perception stimulation system, extrema coding signal processing techniques have to function over a range of over 100 db for acoustic signals. Limitations were imposed partially by the sensitivity and overdrive capabilities of the clipper, but mainly by the dynamic range of noise levels. Circuits to increase dynamic range, for instance expanders, exist, but impose additional gain/bandwidth limitations.

SUMMARY OF THE INVENTION

Accordingly, it is an object of the present invention to remedy the above noted problems present in extrema coding systems.

It is yet still another object of the present invention to provide an extrema coding signal processing system which is adaptive to the level of the input signal provided to the system.

It is still a further object of the present invention to provide an extrema coding signal processing system wherein the relative levels of the input signal and noise signal can be automatically adjusted.

It is yet still a further object of the present invention to provide an extrema coding signal processing system wherein the random noise added to the input signal can be varied depending upon the signal level of the input analog signal.

It is yet still another object of the present invention to provide an extrema coding signal processing system where the signal level of the input analog signal can be adjusted relative to the noise signal level.

It is yet another object of the present invention to provide an extrema coding signal processing system which eliminates, to a large extent, the clipping noise present in extrema coding signal processing systems when low level input signals are provided to the system.

The above and other objects are achieved according to one embodiment of the present invention by an apparatus for processing an analog signal comprising means for detecting the times of occurrence of minimum and maximum values of the analog signal, thereby producing a detected signal, means for providing substantially random noise to the analog signal or to the detected signal, the noise being superimposed thereon and having a broadband spectrum having frequencies in a frequency range substantially higher than the highest frequency in the analog signal, means coupled to the means for detecting for encoding only the times of occurrence of minimum and maximum values of the analog signal in the presence of the noise as an encoded signal, the encoding means having a bandwidth greater than the bandwidth of the analog signal, the encoded signal containing information to enable substantial reproduction of the analog signal therefrom, the means for providing substantially random noise to the analog signal or to the detected signal comprising noise source means, and further comprising gain control means comprising amplifier means and detector means, the detector means having an input provided with the analog signal or the detected signal, and having an output related to an average value of the power in the analog signal or detected signal, the average value signal being provided as a control input to the amplifier means, the amplifier means having an input coupled to an output of the noise source means, the amplifier means further having an output coupled to an input to the means for encoding, whereby the amplifier means varies the amplitude of the output of the noise source means in dependence on the average value of the analog signal or detected signal.

The above and other objects are also achieved according to a further embodiment of the present invention by an apparatus for processing an analog signal comprising means for detecting the times of occurrence of minimum and maximum values of the analog signal, thereby producing a detected signal, means for providing substantially random noise to the detected signal, the noise being superimposed thereon and having a broadband spectrum having frequencies in a frequency range substantially higher than the highest frequency in the analog signal, means coupled to the means for detecting for encoding only the times of occurrence of minimum and maximum values of the analog signal in the presence of the noise as an encoded signal, the encoding means having a bandwidth greater than the bandwidth of the analog signal, the encoded signal containing information to enable substantial reproduction of the analog signal therefrom, the means for providing substantially random noise to the detected signal comprising noise source means, the apparatus further comprising gain control means comprising amplifier means and detector means, the detector means having an input provided with the detected signal, and having an output related to an average value of the power in the detected signal, the average value signal being provided as a control input to the amplifier means, the amplifier means having an input coupled to an output of the means for detecting, the amplifier means further having an output coupled as an input to the means for encoding, whereby the amplifier means varies the amplitude of the output of the means for detecting in dependance on the average value of the detected signal relative to the noise.

The objects recited above are also achieved by a methods in accordance with the invention.

BRIEF DESCRIPTION OF THE DRAWINGS

The invention will be described in greater detail in the following detailed description with reference to the drawings in which.

DETAILED DESCRIPTION

Figure 1:
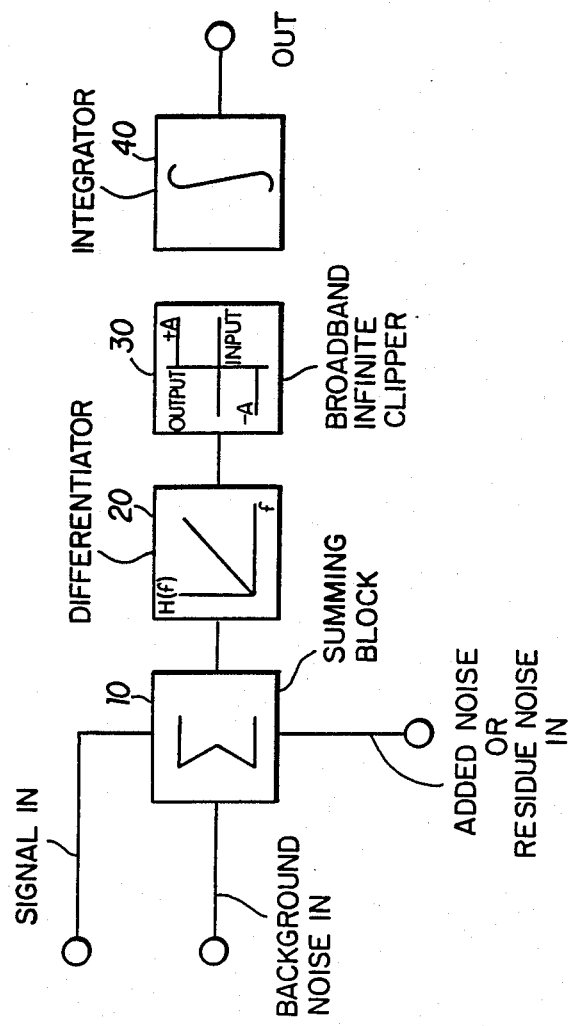
FIG. 1, already discussed, shows the basic block diagram of an extrema coding signal processing system, for example as disclosed in U.S. Pat. No. 4,545,065.
Figure 2:
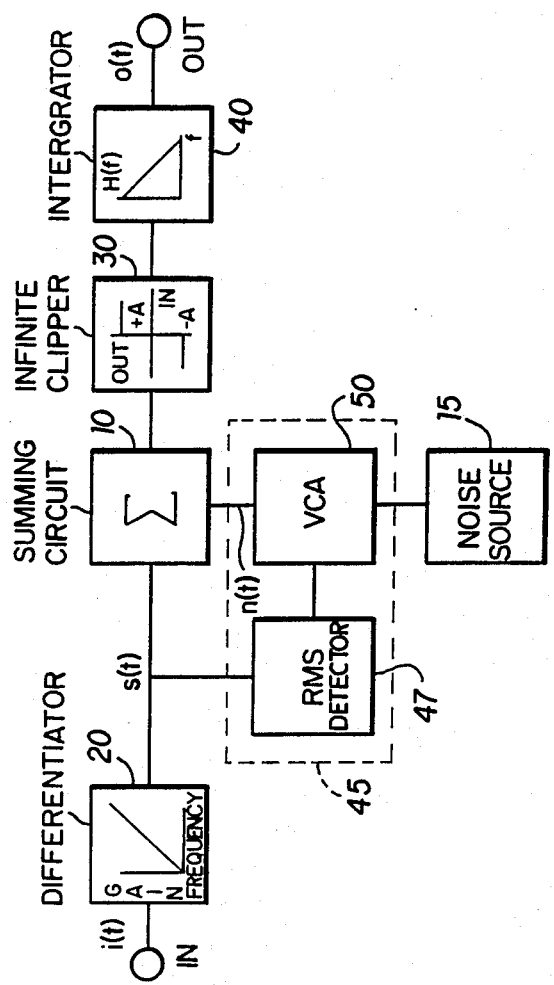
FIG. 2 shows a simplified block diagram of an adaptive extrema coding system according to the present invention.

With reference again to the drawings, and in particular to FIG. 2, the basic principle of the present invention is shown therein. The differentiator is identified by reference numeral 20. A noise source 15 is provided as shown, for adding noise to the analog waveform. As shown by comparing FIGS. 1 and 2, the noise may be added before or after differentiation of the input signal. In FIG. 2, it is added after differentiation. The noise generator 15 no longer supplies to the summing circuit 10, however, a random waveform with a constant energy. A gain control circuit 45 comprising an RMS detector 47 and a voltage controlled amplifier 50 is utilized to alter the RMS noise level provided to the summing circuit. The noise n(t), therefore, adapts to the level of the incoming signal. The RMS detector is provided with the input signal s(t), which in the embodiment shown is the differentiated analog signal and any background noise. As a result of the fact that the added noise n(t) is made to adapt to the energy in the stimuli s(t) at the input of the extrema coding signal processing system, the apparatus shown in FIG. 2 is called an adaptive extrema coding system. The overall practicality and operation of this system of processing relies on the fact that the human perception system appears to be incapable of detecting the signal distortions caused by the system. These distortions may include amplitude compression, and in more dramatic situations, the overall loss of information. As shown in FIG. 2 the output of the summing circuit 10 is then fed to the infinite clipping circuit 30, whose output is then coupled to integrator 40.

Thus, as shown in FIG. 2, RMS detector 47 detects the RMS level of the incoming signal, and adapts the amplitude of the noise source accordingly. Thus, when there is a low level analog signal or a near zero level, the amplitude of the noise is reduced, thus reducing the level of clipping noise during low level signal operation. As discussed above, the presence of the noise when the analog signal level is extremely low can lead to clipping noise which may be audible, in the absence of the adaptive extrema coding processing system.

Figure 3:
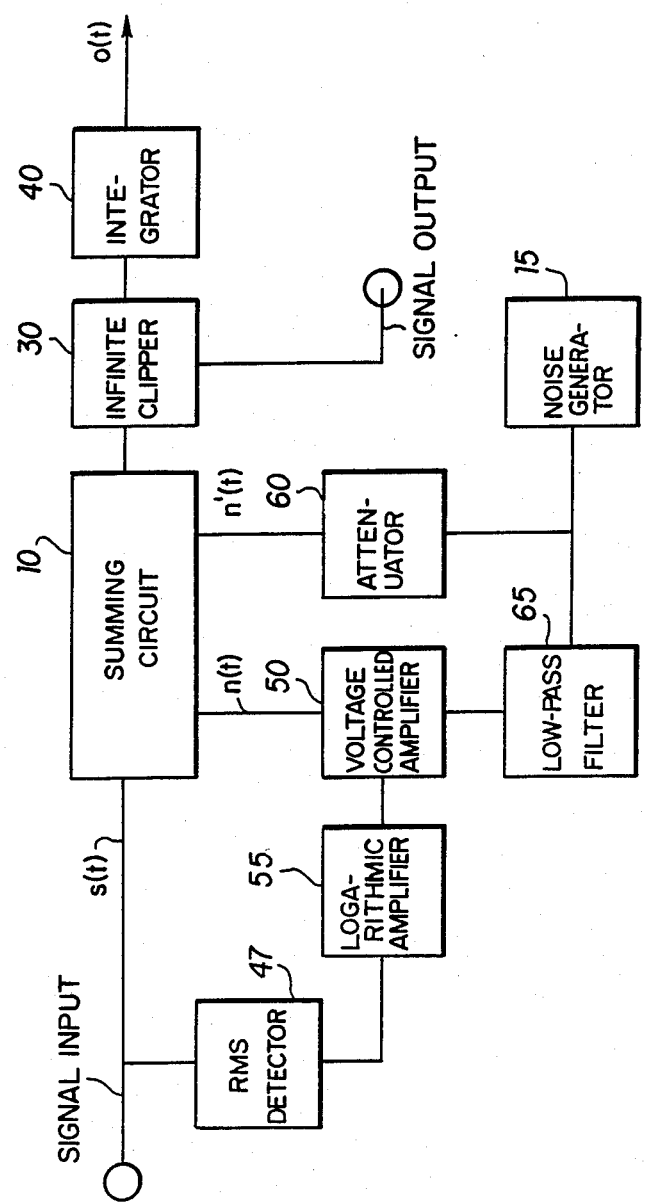
FIG. 3 shows a more detailed block diagram of an adaptive extrema coding system according to the present invention.

FIG. 3 shows the block diagram of an extrema coding signal processing system in more detail. If the RMS value of the noise n(t) were to follow the signal power in a linear fashion, the input/output characteristic of the system would be flat. The system would behave much like an automatic gain control circuit with a similarly flat input/output relationship, causing both subjective degradation and instability problems. When the relationship between signal energy and noise energy follows certain logarithmic curves, however, subjective degradation may be unnoticeable. In order to accomplish this effect, logarithmic compression circuit 55 is provided between the RMS detector 47 and the voltage controlled amplifier. Alternatively, the logarithmic compression circuit 55 may be integrated into the detector 47 and/or voltage controlled amplifier 50, as explained with reference to FIG. 4. A typical input/output relationship for the amplifier/compressor 55 is shown in FIG. 5.

When no input signal s(t) is present, the RMS detector would give a zero level, thus forcing the noise n(t) at the output of the gain control circuit to be very low in amplitude. In this case, the infinite clipper 30 might not see sufficient zero crossings to give an output signal with short time intervals between transitions. The signal o(t) at the output of the integrator circuit could show many strong frequency components unrelated to any input. To avoid this problem, at all times, a small amount of noise is added to the summing circuit by means of an extra attenuator 60. The same effect may be obtained when the compression circuit 55 is altered to provide a low DC level output in the absence of input energy, which theoretically can be done, as discussed with reference to FIG. 2. As shown in FIG. 3, the output of the noise generator 15 is provided to the attenuator 60 which is coupled into the summing circuit 10. The output of noise generator 15 is also provided to a low pass filter circuit 65. The 3 db bandwidth of the low pass filter may be approximately 5 MHz.

The advantages of the adaptive extrema coding system over unadaptive extrema coding, will now be described.

First, the input amplitude dynamic range of stimuli to be processed without noticeable subjective degradation is extended significantly. Where this range for normal extrema coding depends largely on the probability density distribution of both background stimuli and added noise, the adapted noise can now follow the signal to more extreme high and low levels. In theory, the input dynamic range would be infinite. When considering design limitations, practical values exceed the 140 db limit. For unadaptive extrema coding signal processing, this range was limited to some 80 db.

Secondly, the clipping speed of the clipper and the bandwidth of the added noise may be reduced. This property results from two effects. Firstly, it is due to the accuracy with which input stimuli can be represented by the timing features in the input waveform. In unadaptive extrema coding, to reach an approximation that can be called adequate for subjective and objective evaluation, only a relatively modest number of zero crossings are required for each waveform segment. Where a lower number of features would result in degradation, a larger zero crossing rate will no longer add to the perceived quality. When the additive noise is uncorrelated with the signal, the number of features per second will vary widely. Usually, a large portion of the crossings will be redundant. By means of adaptive extrema coding, noise is added at more relevant levels. The noise bandwidth can now be selected more effectively. The clipping speed, necessary to follow the noise, can be decreased. A second reason why clipping speed may be lowered is based on the way in which low intensity stimuli can now be processed. Without adaptive noise, low level signals would be masked by the added noise. The clipping of added noise in the absence of other stimuli requires a wide band process in order to attain low output levels. When the noise adapts to the signal power, however, the low intensity signals can be maintained. Psychophysics testing has shown that the low level signals, when processed and then amplified by the system, will appear as ordinary low level stimuli. Clipped Gaussian noise is perceived as a somewhat, uncommon, sometimes irritating stimulus. When input levels are raised, the perception system does not appear to detect the effects of the amplitude compression, usually linked to automatic gain control techniques.

Third, the system works more effectively as a feature detector. The subjective quality at the output of the system is maintained while in the meantime, the number of features per second is decreased substantially. This property results from the fact that the zero crossing rate is lowered. The portion of the original information that is made redundant by the system is much larger. Where information reduction factors for extrema coding signal processing in practical systems may range from 1.5 to 4, adaptive extrema coding may maintain only 30 to 10% of the original signal. In communication systems, this property will result in more dramatic bit rate compression for voice and video signals.

Fourth, the system gives more natural noise masking effects. As it is likely that the human perception system operates much like a zero crossing detector that by itself adapts to stimulus intensity, it appears that adaptive extrema coding systems will function better for signals that would require active use of these adaptation functions. It is believed that the masking effects as observed in psychophysics testing are linked to noise adaptation.

Fifth, an effect linked to masking by the perception system can be exploited in an ambient noise or background noise reduction system using adaptive extrema coding. When a focal stimulus is accompanied by background noise it is common that the main stimulus is kept at a level at least some 10 to 20 db above the ambient noise. This effect may be accomplished by a human, for example, producing speech. The hearing system will enable the speaker to measure the background and then to generate the speech at a level sufficiently high for the listener to distinguish noise and signal. In such a case, the adaptive noise is provided at a level sufficient to mask most of the background noise but not the signal. The output of the adaptive extrema coding system may provide a waveform with enhanced speech quality. Similar effects are also expected for video signals.

Figure 4:
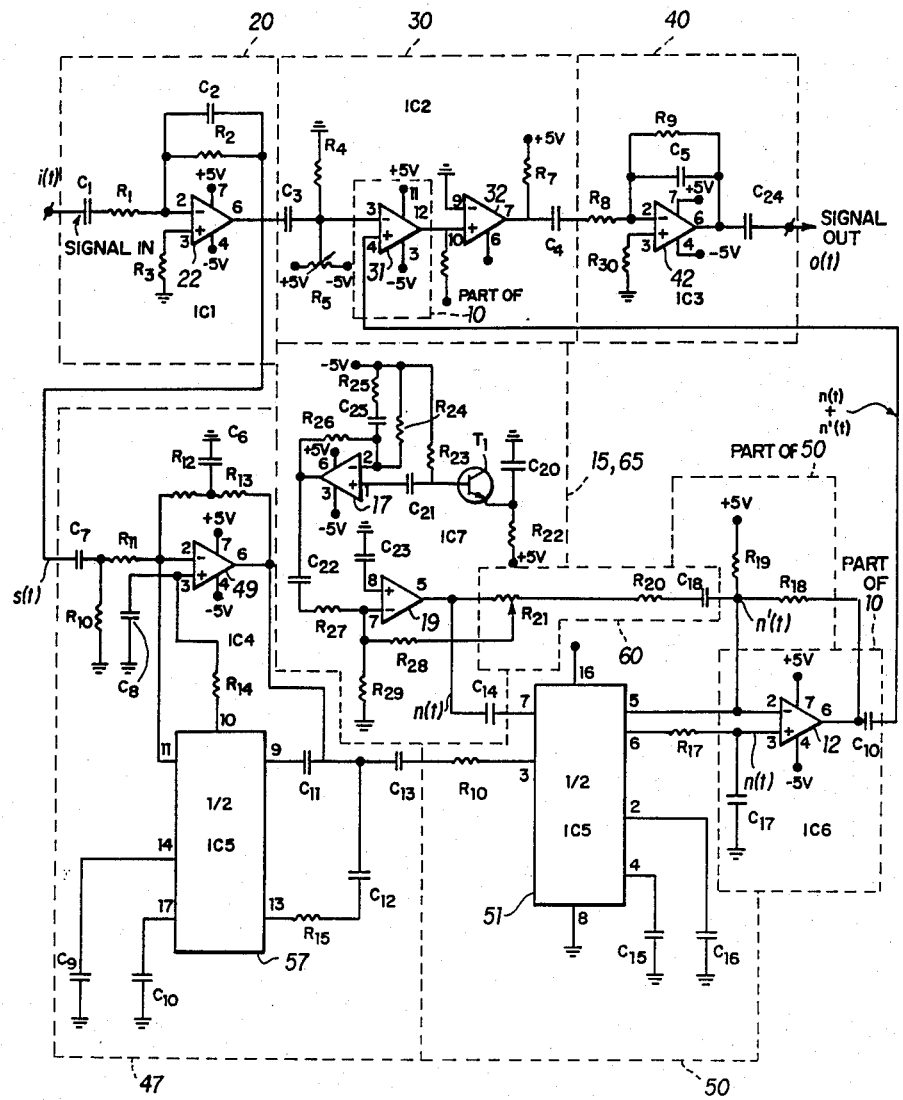
FIG. 4 shows a detailed circuit diagram of an adaptive extrema coding system.
Figure 5:
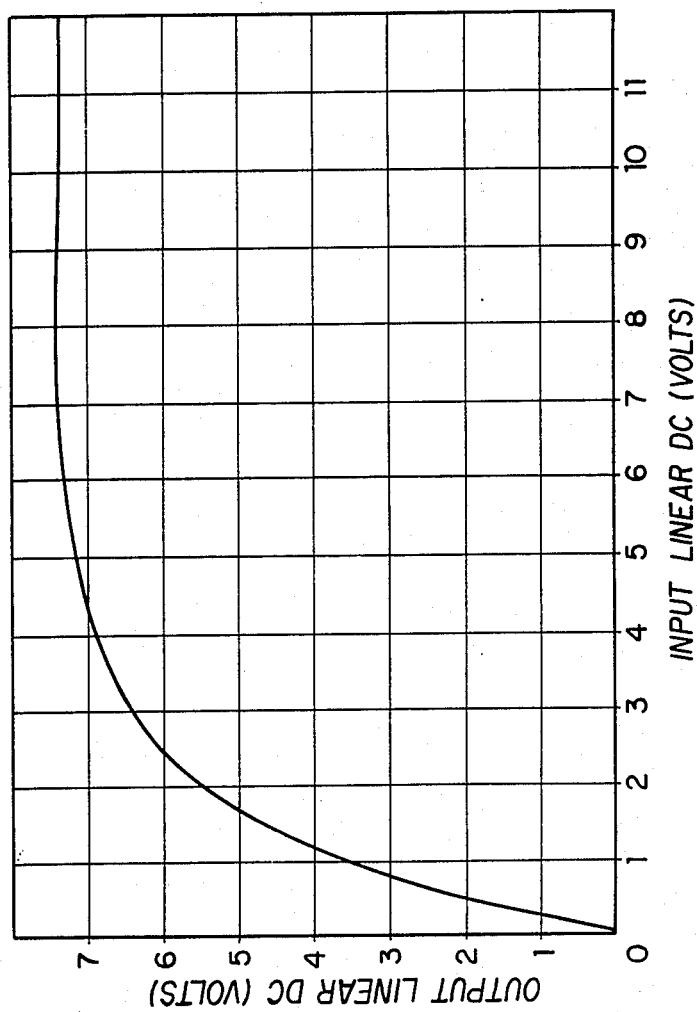
FIG. 5 shows the input/output relationship of a part of the block diagram of FIG. 3.

FIG. 4 shows the circuit diagram of an adaptive extrema coding system. The active differentiator circuit is shown at 20, and includes an operational amplifier 22, which may be a type LF356. The differentiator circuit 20 preferably has a cut-off frequency of about 10 kHz. Capacitor C2 is provided to limit the gain at higher frequencies.

The infinite clipping circuit is shown at 30. The broadband infinite clipper 30 utilizes two stages 31 and 32. Each of these stages may comprise an LM319 operational amplifier comparator circuit. The bandwidth of the clipper circuit preferably exceeds 10 MHz. By means of a multiturn potentiometer R5, an accurate DC adjustment is made to make the comparator switch at an input level close to zero. The DC voltage (illustratively 5 V) connected to resistor R7 determines the output swing of the clipper circuit.

The integrator circuit is shown at 40. The active integrator 40 comprises an operational amplifier 42, which may be a type LF356. The circuit preferably has a cut-off frequency of about 20 hertz as determined by capacitor C5 and resistor R8.

The combined noise source and low pass filter are shown in FIG. 4 by reference numerals 15 and 65. The noise source 15 provides random noise with a bandwidth of about 5 MHz. The actual noise is generated by an NPN transistor T1 operated as a zener diode. The RMS voltage at the base of transistor T1 is about 4 millivolts. The base of transistor T1 is connected to the positive input of low noise preamplifier stage 17, which may be a type LM387. Low noise preamplifier 17, as shown, may be configured to amplify the low level noise by a factor of about 33. A second preamplifier stage 19 may provide a gain of approximately 3 and may also a type LM387. The entire noise generator circuit provides a noise output n(t) of about 400 millivolts RMS. The noise signal is capacitively coupled by capacitor C14 to the voltage controlled amplifier circuit 50.

As shown in FIG. 4, the attenuator circuit 60 comprises a variable resistor R21. The output of the variable resistor R21 is provided to a part of summing circuit 10 which comprises an operational amplifier stage 12. Operational amplifier 12 may be a type LF356 and combines the output of amplifier circuit 50, to be described below, and the attenuated noise signal.

The RMS detector 47 is as indicated in FIG. 4. Actually, RMS detector 47 of FIG. 4 also accomplishes the logarithmic amplification/compression shown at 55 in FIG. 3 since it performs at the same time a logarithmic compression function. Circuit 47 is built around an operational amplifier stage 49 and an integrated circuit 57 which may comprise a type NE572. Operational amplifier 49 may comprise a type LF356. The output of differentiator circuit 20, s(t), is coupled to circuit 47 by means of capacitor C7. The integrated circuit 57 will function as an absolute value detector with an 80 dB input dynamic range.

The output of circuit 47, when coupled to a second stage NE572 integrated circuit 51, provides a voltage controlled amplifier 50 with a logarithmic response determined by the control signal, which is the output of the logarithmic amplifier circuit 47. Integrated circuit 51, normally used in compander circuits, is well suited for this application. When the input varies over the full range of 80 db, the gain of the voltage controlled amplifier 50 will vary by about 50 db. An additional advantage of this circuit over other operational amplifier designs is its wide bandwidth.

The RMS voltage of the noise thus controlled by the RMS voltage of the input signal s(t) is provided to the positive input of operational amplifier 31 whereby the noise signal mixes with the differentiated analog input signal. As shown, part of the summing operation shown by block 10 in FIG. 3 is performed by operational amplifier 12, in order to provide the adaptive noise signal n(t) and the attenuated noise signal n'(t), and the combined noise signal n(t) plus n'(t) is then added to the differentiated analog signal by operational amplifier 31. Other means of performing the summing operation can also be provided.

The gain of the voltage controlled amplifier 50 is set by means of resistor R18. The response times of the absolute value detector circuit 47 and the voltage controlled amplifier 50 are controlled by four capacitors. The attack times are set by capacitors C10 and C15, and the decay times by C9 and C16.

As indicated above, the attenuation circuit 60 is provided by resistors R21 and R20 and capacitor C18. This circuit provides a small amount of noise to the clipper 30 in case the input signal s(t) is close to zero. At this low level the added noise adjusted by R21 must be sufficient for the clipper to trigger at a high rate, in order to prevent low frequency noise components from being audible.

Preferred components and component values for the circuit of FIG. 4 are as indicated in the following table:

| 22, 42, 49, 12 | LF356 |
| --- | --- |
| 31, 32 | LM319 |
| 17, 19 | LM387 |
| 51, 57 | NE572 |
| T1 | BC109C |
| R1 | 6.8K |
| R2 | 12K |
| R3 | 6.8K |
| R4 | 2.2K |
| R5 | 20K |
| R6 | 10K |
| R7 | 1K |

-continued

| R8 | 100K |
| --- | --- |
| R9 | 100K |
| R10 | 15K |
| R11 | 15K |
| R12 | 10K |
| R13 | 10K |
| R14 | 1K |
| R15 | 1K |
| R16 | 1K |
| R17 | 1K |
| R18 | 15K |
| R19 | 10K |
| R20 | 15K |
| R21 | 100K |
| R22 | 10K |
| R23 | 100K |
| R24 | 33K |
| R25 | 3.3K |
| R26 | 100K |
| R27 | 33K |
| R28 | 10K |
| R29 | 33K |
| (All resistances in ohms) | |
| C1 | 2 n |
| C2 | 2 n |
| C3 | 10 u |
| C4 | 1 u |
| C5 | 47 n |
| C6 | 10 u |
| C7 | 2.2 u |
| C8 | 2.2 u |
| C9 | 10 u |
| C10 | 1 u |
| C11 | 2.2 u |
| C12 | 2.2 u |
| C13 | 2.2 u |
| C14 | 3.3 u |
| C15 | 10 u |
| C16 | 3.3 u |
| C17 | 2.2 u |
| C18 | 10 n |
| C19 | 3.3 u |
| C20 | 100 n |
| C21 | 100 n |
| C22 | 22 n |
| C23 | 100 n |
| C24 | 10 u |
| C25 | 1 n |
| (All capacitors in Farads) | |

Figure 6:
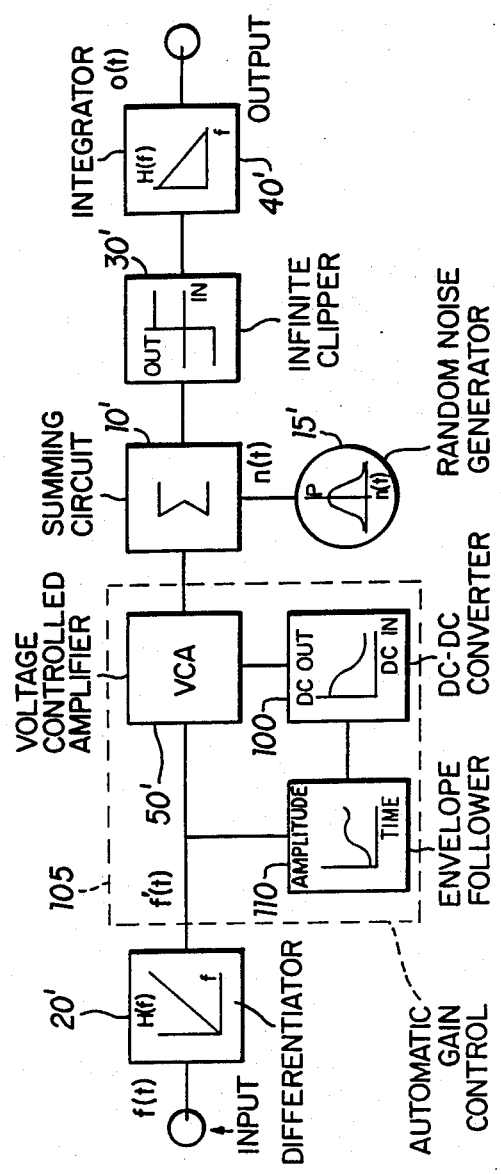
FIG. 6 shows a block diagram of an alternative embodiment of an adaptive extrema coding system according to the present invention.

FIG. 6 shows the block diagram of an alternative in embodiment of an adaptive extrema coding system according to the present invention. In the apparatus shown in FIG. 6, instead of adjusting the noise source level, the noise source level remains constant and the input signal noise level is varied and thus adapted to the noise source level. Thus, according to the present invention, the noise can be adjusted relative to the input signal or the input signal can be adjusted relative to the noise.

Figure 7:
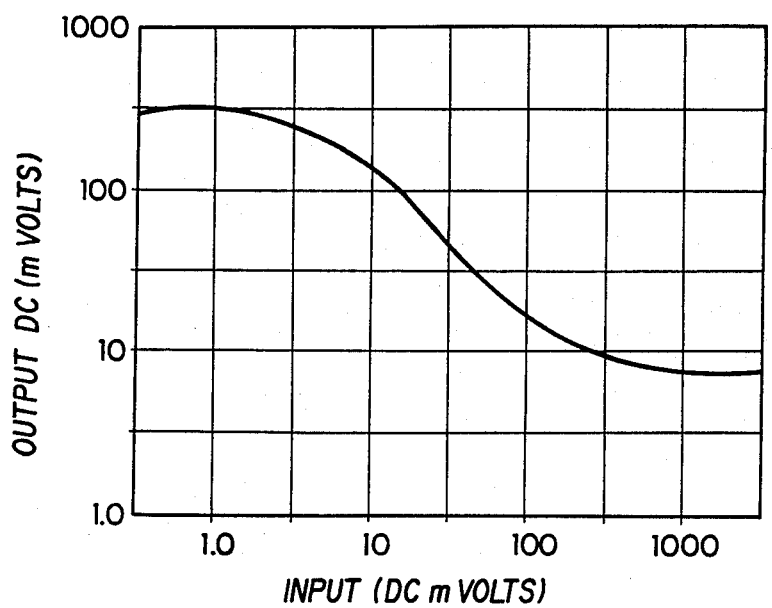
FIG. 7 is an input/output characteristic curve for a part of the block diagram of FIG. 6.

The adaptation shown in FIG. 6 takes place by means of a voltage controlled amplifier 50'. The control input of the voltage controlled amplifier 50' is coupled to a d.c. to d.c. converter 100, whose input in turn is coupled to the output of an envelope follower 110. An input/output characteristic curve for a preferred embodiment of the DC-DC converter is shown in FIG. 7. The input of the envelope follower 110 is coupled to the differentiated input signal provided at the output of differentiator 20'. The output of the voltage controlled amplifier 50' is fed to summing circuit 10' whose other input is coupled to noise source 15'. As in the other embodiments described, the output of the summing circuit is coupled to infinite clipping circuit 30' whose output is provided to integrator 40'. Since the clipping circuit 30' works merely as a comparator of signals and noise levels, reducing or increasing the noise, respectively, is essentially the same as raising or lowering the signal level, respectively.

An advantage of the apparatus shown in the block diagram of FIG. 6 is that the band limited input signal is being adapted instead of the more wide band noise signal. In addition, it is possible to use a traditional automatic gain control circuit to replace the envelope detector 110, d.c. to d.c. converter 100 and voltage controlled amplifier 50' shown in FIG. 6. Existing automatic gain control circuits, however, have to be modified substantially in order to obtain good subjective quality. In a preferred design, attack and decay times of the envelope follower are of much shorter duration (100 us to 1 ms) than in conventional automatic gain control circuits. Furthermore, the automatic gain control block, indicated by reference number 105, is preceded by the differentiating circuit 20'. Simply coupling the automatic gain control circuit 105 will not be sufficient.

In the foregoing specification, the invention has been described with reference to exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for processing an analog signal comprising:
   means for detecting the times of occurrence of minimum and maximum values of said analog signal, thereby producing a detected signal;
   means for providing substantially random noise to said analog signal or said detected signal, said noise being superimposed thereon and having a broadband spectrum having frequencies in a frequency range substantially higher than the highest frequency in said analog signal;
   means coupled to said means for detecting for encoding only said times of occurrence of minimum and maximum values of said analog signal in the presence of said noise as an encoded signal, said encoding means having a bandwidth greater than the bandwidth of said analog signal, said encoded signal containing information to enable substantial reproduction of said analog signal therefrom;
   said means for providing substantially random noise to said analog signal or said detected signal comprising noise source means, and further comprising gain control means comprising amplifier means and detector means, said detector means having an input provided with said analog signal or said detected signal, and having an output related to an average value of the power in said analog signal or detected signal, said average value signal being provided as a control input to said amplifier means, said amplifier means having an input coupled to an output of said noise source means, said amplifier means further having an output coupled as an input to said means for encoding, whereby said amplifier means varies the amplitude of said output of said noise source means in dependance on the average value of said analog signal or detected signal.

2. The apparatus recited in claim 1, wherein said detecting means comprises a differentiator for converting said times of occurrence of minimum and maximum values into time axis zero crossings, and said encoding means comprises clipping means for encoding said time axis zero crossings into transitions of a binary signal.

3. The apparatus recited in claim 2, wherein said clipping means comprises infinite clipping means.

4. The apparatus recited in claim 1, further comprising means coupled to said encoding means receiving said encoded signal as an input for producing a signal subjectively the same as said analog signal to the human sensory system.

5. The apparatus recited in claim 4, wherein said means for producing comprises integrating means.

6. The apparatus recited in claim 1, wherein said detector means comprises root mean square average value detector means and said amplifier means comprises voltage controlled amplifier means.

7. The apparatus recited in claim 1, further comprising summing circuit means coupling said means for detecting and said means for encoding, and further having an input coupled to said amplifier means, for summing said detected signal and the output of said amplifier means.

8. The apparatus recited in claim 1, further comprising logarithmic amplifier or compression means for providing a logarithmic input control signal to said amplifier means.

9. The apparatus recited in claim 1, further comprising means for coupling the output of said noise source means to said means for encoding whereby a portion of said noise signal from said noise source means is provided to said encoding means without passing through said amplifier means.

10. The apparatus recited in claim 9, wherein said means for coupling comprises attenuation means.

11. The apparatus recited in claim 10, further comprising summing circuit means provided between said means for detecting and said means for encoding for providing a combined signal, said summing circuit means summing said detected signal, the output of said amplifier means and the output of said attenuation means, and providing said combined signal to said means for encoding.

12. A method for processing an analog signal comprising:
   detecting the times of occurrence of minimum and maximum values of said analog signal, thereby producing a detected signal;
   providing substantially random noise to said analog signal or said detected signal, said noise being superimposed thereon and having a broadband spectrum having frequencies in a frequency range substantially higher than the highest frequency in said analog signal;
   encoding only said times of occurrence of minimum and maximum values of said analog signal in the presence of said noise as an encoded signal, said step of encoding comprising encoding with encoding means having a bandwidth greater than the bandwidth of said analog signal, said encoded signal containing information to enable substantial reproduction of said analog signal therefrom;
   said step of providing substantially random noise to said analog signal or said detected signal comprising adding noise from noise source means, and further comprising controlling the amplitude of said noise by detecting a signal related to an average value of the power in said analog signal or said detected signal to provide an average value signal and using said average value signal as a control signal to vary the amplitude of said said noise.

13. The method recited in claim 12, wherein said first recited step of detecting comprises differentiating said analog signal into a differentiated signal to convert the times of occurrence of minimum and maximum values into time zero crossings and said step of encoding comprises clipping said differentiated signal to encode said time axis zero crossings into transitions of a binary signal.

14. The method recited in claim 13, wherein said step of clipping comprises infinite clipping.

15. The method recited in claim 12, further comprising the step of producing a signal subjectively the same as said analog signal to the human sensory system from said encoded signal.

16. The method recited in claim 15, wherein said step of producing comprises integrating.

17. The method recited in claim 12, wherein said second recited step of detecting comprises detecting the root means square average value of said analog signal or said detected signal and said step of controlling the amplitude of said noise comprises controlling said amplitude with amplifier means having an input coupled to said noise source means and a control input provided with said control signal.

18. The method recited in claim 12, further comprising the step of summing said detected signal and the amplitude controlled noise to provide a summed signal to said encoding means.

19. The method recited in claim 17, further comprising the step of logarithmically amplifying or compressing said control signal provided to said amplifier means.

20. The method recited in claim 12, further comprising the step of coupling noise from said noise source means to said means for encoding whereby a portion of said noise from said noise source means is provided to said encoding means without being controlled by said control signal.

21. The method recited in claim 20, wherein said step of coupling comprises the step of attenuating the noise from said noise source means.

22. The method recited in claim 21, further comprising the step of summing said detected signal, the noise controlled by the control signal and the attenuated noise to form a combined signal, and providing said combined signal to said means for encoding.

23. An apparatus for processing an analog signal comprising:
means for detecting the times of occurrence of minimum and maximum values of said analog signal, thereby producing a detected signal;
means for providing substantially random noise to said detected signal, said noise being superimposed thereon and having a broadband spectrum having frequencies in a frequency range substantially higher than the highest frequency in said analog signal;
for detecting for
means coupled to said means for detecting for encoding only said times of occurrence of minimum and maximum values of said analog signal in the presence of said noise as an encoded signal, said encoding means having a bandwidth greater than the bandwidth of said analog signal, said encoded signal containing information to enable substantial reproduction of said analog signal therefrom;
said means for providing substantially random noise to said detected signal comprising noise source means; and further comprising:
gain control means comprising amplifier means and detector means, said detector means having an input provided with said detected signal, and having an output related to an average value of the power in said detected signal, said average value signal being provided as a control input to said amplifier means, said amplifier means having an input coupled to an output of said means for detecting, said amplifier means further having an output coupled as an input to said means for encoding, whereby said amplifier means varies the amplitude of said output of said means for detecting in dependance on the average value of said detected signal relative to said noise.

24. The apparatus recited in claim 23, wherein said detecting means comprises a differentiator for converting said times of occurrence of minimum and maximum values into time axis zero crossings, and said encoding means comprises clipping means for encoding said time axis zero crossings into transitions of a binary signal.

25. The apparatus recited in claim 24, wherein said clipping means comprises infinite clipping means.

26. The apparatus recited in claim 23, further comprising means coupled to said encoding means receiving said encoded signal as an input for producing a signal subjectively the same as said analog signal to the human sensory system.

27. The apparatus recited in claim 26, wherein said means for producing comprises integrating means.

28. The apparatus recited in claim 23, wherein said detector means comprises envelope follower means and said amplifier means comprises voltage controlled amplifier means.

29. The apparatus recited in claim 23, further comprising summing circuit means coupling said gain control means and said means for encoding, and further having an input coupled to said noise source means, for summing the output of said noise source means and the output of said amplifier means.

30. The apparatus recited in claim 23, further comprising DC-DC converter means for providing an input control signal to said amplifier means.

31. A method for processing an analog signal comprising:
detecting the times of occurrence of minimum and maximum values of said analog signal, thereby producing a detected signal;
providing substantially random noise to said detected signal, said noise being superimposed thereon and having a broadband spectrum having frequencies in a frequency range substantially higher than the highest frequency in said analog signal;
encoding only said times of occurrence of minimum and maximum values of said analog signal in the presence of said noise as an encoded signal, said step of encoding comprising encoding with encoding means having a bandwidth greater than the bandwidth of said analog signal, said encoded signal containing information to enable substantial reproduction of said analog signal therefrom;
said step of providing substantially random noise to said analog signal or said detected signal comprising adding noise from noise source means; and further comprising the step of:

controlling the amplitude of said detected signal by detecting a signal related to an average value of the power in said detected signal to provide an average value signal and using said average value signal as a control signal to vary the amplitude of said detected signal relative to said noise.

32. The method recited in claim 31, wherein said first recited step of detecting comprises differentiating said analog signal into a differentiated signal to convert the times of occurrence of minimum and maximum values into time zero crossings and said step of encoding comprises clipping said differentiated signal to encode said time axis zero crossings into transitions of a binary signal.

33. The method recited in claim 32, wherein said step of clipping comprises infinite clipping.

34. The method recited in claim 31, further comprising the step of producing a signal subjectively the same as said analog signal to the human sensory system from said encoded signal.

35. The method recited in claim 34, wherein said step of producing comprises integrating.

36. The method recited in claim 31, wherein said second recited step of detecting comprises detecting the envelope of said detected signal and said step of controlling the amplitude of said detected signal comprises controlling the amplitude with amplifier means having an input provided with said detected signal and a control input provided with said control signal.

37. The method recited in claim 31, further comprising the step of summing the amplitude controlled detected signal and the noise to provide a summed signal to said encoding means.

38. The method recited in claim 36, further comprising the step of processing said control signal provided to said amplifier means.

* * * * *